Patented Aug. 28, 1934

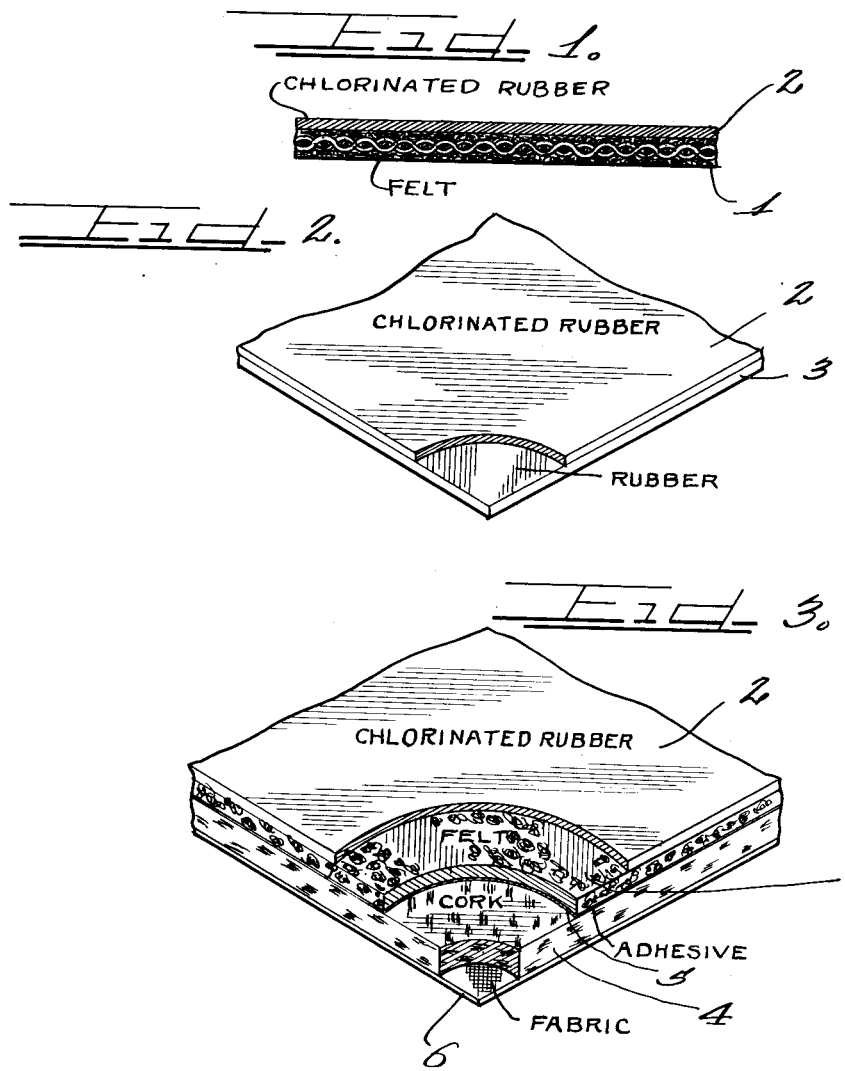

1,971,439

UNITED STATES PATENT OFFICE 1,971,439

PRINTER'S BLANKET

Frederick George Arnold, Chicago, Ill., assignor to Rapid Roller Company, Chicago, Ill., a corporation of Illinois Application June 8, 1933, Serial No. 674,833

7 Claims. (Cl. 154—54.5)

This invention relates to printers' blankets and especially to the type of printer's blanket used on the impression cylinders of rotary printing presses.

More specifically this invention relates to improvements in the surfaces of printers' blankets and deals with the formation of a surface layer which is oil-resistant, ink-repellent, flexible, and resilient on the usual backing or body portion of the blanket.

Heretofore printers' blankets have been made of a fabricated felt material, known as printer's felt, rubber, or a cork material, or any fibrous material having a certain degree of resiliency and compressibility. It has been proposed to coat these body materials with substances such as nitrocellulose, bakelite, vulcanized rubber, and the like to present a wearing surface for the blanket.

It is necessary that the outside surface of the printer's blanket be oil-resistant, ink-repellent, flexible, resilient, and present a certain degree of tensile strength. If the surface is not oil-resistant and ink-repellent, it will swell, become sticky, and will not repel all of the wet ink from the first impression thereby causing a smudging of the subsequent impressions.

The blanket must be flexible and present tensile strength to conform with the shape of the impression cylinder and resist tearing during the continuous pressure existing between the printing plate and the impression cylinder during the printing operation.

Coatings such as bakelite, rubber, nitro-cellulose and various resin or gum varnishes have been proposed for surfacing the blanket body material. These surface coatings are not completely oil-resistant and, after use, the surface of the blanket swells thereby resulting in an uneven surface which lowers the quality of the printing. Furthermore, solvents used on the printing roller or printing plate sometimes come into contact with the surface of the blanket and dissolve or soften the coating on the blanket.

I have now discovered that if the usual body or base materials of printers' blankets is coated with a composition composed of chlorinated rubber and a plasticizer dissolved in a solvent, the resulting surface is smooth, oil-resistant, ink-repellent, flexible, and resilient. In addition, the chlorinated rubber layer has a high degree of tensile strength and possesses superior wearing qualities.

Any halogenated rubber may be used to form the wearing surface of the blanket without departing from the scope of this invention. For example, a brominated rubber may be selected in place of a chlorinated rubber.

To render the halogenated rubber surface more flexible any plasticizer normally used in nitrocellulose lacquers may be added. Examples of suitable plasticizers are tri-cresyl phosphate, di-ethyl phthalate, dibutyl phthalate, castor oil and the like.

Any solvent for the halogenated rubber which is miscible with the common plasticizers may be used. Examples of suitable solvents are hydrocarbons such as benzene and xylene and other organic liquids which will dissolve chlorinated rubber.

It is therefore an object of this invention to provide a surface for printers' blankets which is smooth, flexible, resilient, oil-resistant and ink-repellent.

Another object of this invention is to provide a surface coating for printers' blankets which possesses a high degree of tensile strength and is highly resistant to oil and to ink solvents.

Another object of this invention is to provide a printer's blanket having a working outside surface composed of a halogenated rubber composition which is securely anchored to the blanket base.

Another object of this invention is to provide a printer's blanket having an outside surface of a plasticized chlorinated rubber composition.

A specific object of this invention is to provide a surface layer for printers' blankets composed of chlorinated rubber and a plasticizer.

Other and further objects of this invention will be apparent to those skilled in the art and will be hereinafter more fully described in the following specification and drawing which forms a part of this specification.

On the drawing:

Figure 1 is a cross-sectional view of a printer's blanket according to this invention showing a base material 1 made of a fabricated felt, known to the trade as printer's felt, coated with a layer of a chorinated rubber composition 2 according to this invention.

Figure 2 is a broken isometric view of another form of printer's blanket according to this invention showing a base material 3 composed of rubber having the surface layer 2 of chlorinated rubber anchored thereon. The chlorinated rubber surface layer and the rubber base are integrally united to form a unitary blanket.

Figure 3 is a broken isometric view of another form of printer's blanket according to this invention showing the chlorinated rubber surface layer 2 anchored onto a base or body portion composed of a layer of felt 1 which is backed by a fabric covered cork composition layer 4. The cork composition layer 4 is cemented to the felt layer 1 by an adhesive 5. The cork layer 4 is preferably covered on one or both surfaces with a fabric material such as 6.

The composite blanket shown in Figure 3 possesses a high degree of resiliency, and, in some instances, is preferable to a blanket merely containing a single body material such as felt or rubber. It is to be understood, however, that the surfacing composition of this invention is applicable to any known base or body material used for printers' blankets.

Without limiting the invention to the specific proportions indicated, the following examples show preferred compositions to form the layers 2 of chlorinated rubber on the blanket bases. Parts indicated are parts by weight. In Examples 2 and 3, a preferred type of chlorinated rubber having a viscosity test of 16 seconds is used.

Example I 20 to 40 parts of chlorinated rubber
10 to 75 parts solvents
3 to 10 parts plasticizer.

The above formula indicates a preferred range of ingredients which yields a suitable composition for applying on the felt, rubber or cork base or body portions of a printer's blanket. After the solvent has evaporated, the plasticized chlorinated rubber layer remains to form the smooth surface 2 indicated in the drawing.

Example II 30 parts of 16 second viscosity chlorinated rubber
25 parts xylene
5 parts tri-cresyl phosphate.

In the above composition of the xylene is an example of a suitable hydrocarbon solvent and the tri-cresyl phosphate is an example of a suitable well-known type of plasticizer. When in the proper proportions, a composition is obtained which is readily coated onto the base materials used in printers' blankets to form a smooth, flexible, oil-resistant and ink-repellent layer which possesses a high degree of tensile strength.

Example III 30 parts of 16 second viscosity chlorinated rubber
30 parts benzene
6 parts dibutyl phthalate.

The above composition illustrates another preferred specific formula according to this invention which, when coated onto the base material commonly used in printers' blankets, dries to form a plasticized chlorinated rubber surface layer securely anchored to the base material.

From the above description it is evident that I have provided a novel outside surface or working layer for printers' blankets which is securely anchored to the base or body portion of the blanket and which possesses superior qualities to heretofore proposed surfacing materials. The surface layer is readily applied by merely coating the composition described above onto the base or body portion of the blanket and allowing the solvent in the composition to evaporate. The dried coating is a smooth layer which is securely anchored into the base layer. It possesses high tensile strength, is flexible, resilient, and ink-repellent besides being practically inert toward oils and ink-solvents.

If desired, any suitable pigment or soluble coloring matter may be added to the coating composition to impart a colored surface to the blanket. In some instances I may mix lampblack with the plasticizer before adding it to the chlorinated rubber. This yields a brilliant black surface on the blanket.

I am aware that many changes may be made and numerous details of construction may be varied through a wide range without departing from the principles of this invention, and I, therefore, do not purpose limiting the patent granted hereon otherwise than necessitated by the prior art.

Having now described my invention, I claim:

1. A printer's blanket comprising a resilient body portion and a smooth surface coating of a flexible and resilient halogenated rubber composition on a face of said body portion.

2. A printer's blanket comprising a resilient body portion having one face thereof coated with a flexible and resilient plasticized halogenated rubber composition.

3. A printer's blanket comprising a base layer of felt material coated on one face with a flexible and resilient chlorinated rubber composition.

4. A printer's blanket comprising a web of a felt material, a surface layer of a flexible and resilient chlorinated rubber composition and a backing of a cork composition, said web, surface layer and backing being integrally joined to form a unitary blanket.

5. A printer's blanket comprising a layer of resilient material that has been coated on one face with a composition having the following formula:

20 to 40 parts chlorinated rubber
10 to 75 parts solvent
3 to 10 parts plasticizer.

6. A printer's blanket comprising a flexible resilient base coated with a composition having the following formula:

30 parts 16 second viscosity chlorinated rubber
5 parts tri-cresyl phosphate.

7. A printer's blanket comprising a body portion of rubber and a layer of plasticized chlorinated rubber anchored on one surface thereof.

FREDERICK GEORGE ARNOLD.